Aug. 18, 1925.

G. W. OAKES 1,550,566

COMBINED DUST CAP AND AIR SEAL FOR TIRE VALVE STEMS

Filed Aug. 29, 1924

WITNESSES
Bernard Aebly

INVENTOR
George W. Oakes
BY
ATTORNEYS

Patented Aug. 18, 1925.

1,550,566

UNITED STATES PATENT OFFICE.

GEORGE W. OAKES, OF CRYSTAL CITY, MISSOURI.

COMBINED DUST CAP AND AIR SEAL FOR TIRE-VALVE STEMS.

Application filed August 29, 1924. Serial No. 734,987.

*To all whom it may concern:*

Be it known that I, GEORGE W. OAKES, a citizen of the United States, and a resident of Crystal City, in the county of Jefferson and State of Missouri, have invented certain new and useful Improvements in Combined Dust Caps and Air Seals for Tire-Valve Stems, of which the following is a specification.

My invention is a combined dust cap and air seal for tire valve stems, and it consists in the combinations, constructions and arrangements herein described and claimed.

An object of the invention is to provide a simple, reliable and inexpensive device of the character described which can be conveniently and easily applied to and removed from tire valve stems of various lengths and which when in applied position on a tire valve stem will be held in place securely although releasably on the tire valve stem.

A further object of the invention is to provide a device of the character described which is compact in form and in which all relatively movable parts are completely housed in a dust excluding cap when the device is in applied position on a tire valve stem.

Other objects and advantages will be apparent from the following description, considered in conjunction with the accompanying drawings, in which—

Figure 1:
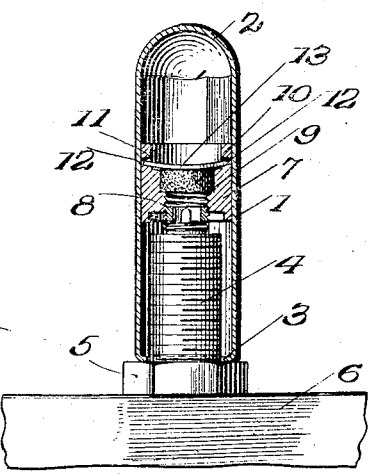
Figure 1 is a longitudinal vertical section through a device embodying the invention, in the position which it occupies on a tire valve stem before the dust excluding cap of the device is locked to the tire valve stem, the tire valve stem, a sealing member of the device and a portion of the felloe of a wheel being shown in side elevation.
Figure 2:
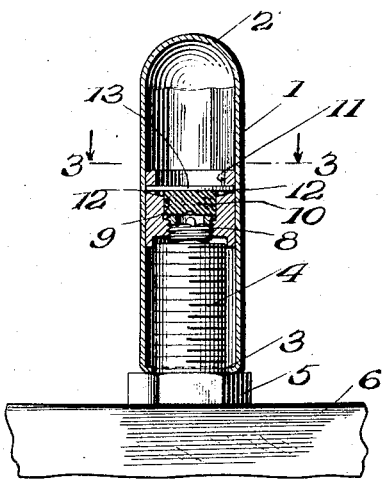
Figure 2 is a view similar to Figure 1, showing the device locked to the tire valve stem, the sealing member being shown in section.

A device embodying the invention comprises a dust excluding cap 1 having a relatively long tubular body closed at its outer end, as at 2, and being crimped or bent inwardly at its inner, as at 3, to engage more or less closely with a tire valve stem, such as that designated 4, without preventing free sliding movement of the open end of the cap 1 over the outer end of the tire valve stem and along the latter to position against the rim nut 5 which locks the tire valve stem against radial inward movement in respect to the felloe 6. The crimping or bending inward of the body of cap 1 at its inner end also serves to prevent displacement from the interior of the cap of means for sealing the outer end of the stem 4 against the escape of air therefrom and for locking the cap 1 to the stem 4.

Figure 3:
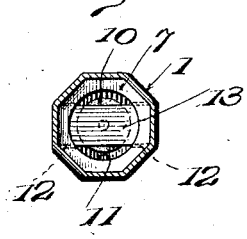
Figure 3 is a section along the line 3—3 of Figure 2.

The sealing and locking means comprise a nut 7 which slidably fits in the body of the cap 1 and is held against rotation within the body of the cap by reason of the engagement of the outer wall of the nut with the inner wall of the cap, the nut being non-circular in cross sectional contour and the inner wall of the body of the cap being correspondingly configured. In Figure 3, I show one configuration which the outer wall of the nut 7 and the inner wall of the body of the cap 1 may have, but it will be understood that the nut and the inner wall of the cap may have any non-circular configuration without departing from the spirit and scope of the invention.

The screw threads on the bore of the nut 7 extend from the inner end of the nut for part of its length and are adapted to engage screw threads on the outer end portion of the tire valve stem, as at 8. The bore of the nut 7 is slightly enlarged at the outer end of the threaded portion thereof as indicated at 9 for the reception of a closure or sealing member 10 which slides therewithin and is made of any suitable compressible or pliable material, such as rubber, leather, lead or the like. The bore of the nut 7 is further enlarged from the outer end of the portion 9 thereof to its outer end as indicated at 11 and is provided with diametrically opposite radial openings 12 at the juncture of the portions 9 and 11 of the bore. A locking member 13 made of a material possessing inherent resiliency, such as spring steel, hard rubber or the like, and which is adapted to be extended diametrically of the nut 7, extends transversely of the bore of the nut through the openings 12. The locking member 13 preferably is a length of spring steel which is introduced through the portion 11 of the bore of the nut to position to rest at its ends in the openings 12, the ends of the spring member normally terminating substantially flush with the outer ends of the openings 12 and the spring member being inwardly curved or bowed between its ends as shown in Figure 1. It will be observed that the inner walls of the openings 12 incline inwardly from the outer ends of the openings to permit the spring member to bow inwardly as shown in Figure 1, while the outer walls of the openings 12 lie in a plane which extends diametrically of the nut 7 and therefore tend to prevent the spring member from being bowed outwardly.

From the foregoing description of the device the operation thereof may be readily understood. The body of the cap 1 is sufficiently long to receive the protruding end portions of a tire valve stem of any one of a plurality of lengths within a considerable range. To apply the device the cap 1 is slipped over the outer end of the tire valve stem and along the latter until the nut 7 is in position to engage the threaded outer end portion of tire valve stem and the crimped or inwardly bent inner end portion of the body of the cap abuts the rim nut 5. Approximately two complete revolutions of the cap 1 and of course of the nut 7 therewithin in one direction will cause the nut 7 to be screwed onto the end portion of the tire valve stem until the end of the tire valve stem has engaged with and exerted pressure on the compressible closure member 10 which in turn has transmitted pressure against the inwardly bowed intermediate portion of the spring locking member 13. The pressure on the latter will tend to straighten it and the ends thereof will be projected from the outer ends of the openings 12 against the inner wall of the body of the cap. The frictional engagement of the ends of the locking member 12 with the inner wall of the body of the cap 1 will lock the latter to the nut 7 and therefore to the stem 4 and the cap will be held in close contact at its inner end with the rim nut 5 so that entrance of dust between the rim nut 5 and the inner end of the cap will be practically prevented. At the same time, the closure or sealing member 10 will be compressed between the spring 13 and the outer end of the stem 4 and will effectually seal the latter. The member 13 may be a length of hard rubber or any other resilient material which is adapted to be extended longitudinally when pressure is applied on the intermediate portion thereof.

To remove the device from applied position on the tire valve stem, it is only necessary to turn the cap in the direction opposite to that hereinbefore mentioned to cause the nut 7 to disengage the stem 4.

Figure 4:
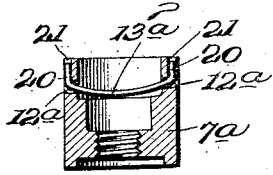
Figure 4 is a vertical section through a modified form of means for locking the dust cap to the tire valve stem.

In the modified form of locking means shown in Figure 4, the nut is designated 7$^a$ and is provided with opposite lateral openings 12$^a$ in the internally enlarged outer end portion thereof. The spring locking member 13$^a$ differs from the locking member 13 only in that the end portions of the member 13$^a$ do not terminate flush with the outer ends of the openings 12 when the spring member 13$^a$ is in bowed inactive position but extend as indicated at 20 in grooves 21 in the outer wall of the nut toward the outer end of the latter and are adapted to bear flatwise against the inner wall of the dust excluding cap 1.

Figure 5:
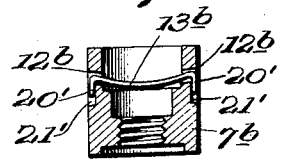
Figure 5 is a view similar to Figure 4, showing another modified form of locking means.

In the form of locking device illustrated in Fig. 5, the locking member 13$^b$ has end portions 20′ extending in grooves 21′ from the outer ends of opposite lateral openings 12$^b$ in a nut 7$^b$ toward the inner end of the nut, the end portions 20′ also being adapted to bear flatwise against the inner wall of the dust excluding cap 1. With the spring locking member provided with extending end portions bearing flatwise against the inner wall of the dust excluding cap, a relatively great friction is produced between the locking member and the cap on relative movement of these members.

Figure 6:
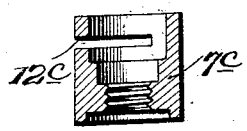
Figure 6 is a vertical section through a nut which is comprised in still another modified form of locking means.

In Figure 6, I show a nut 7$^c$ having a transverse slot 12$^c$ in the form of a kerf extending more than half way through the nut and adapted to permit of the lateral insertion of any one of the hereinbefore described spring locking members to position in the slot 12$^c$ to engage at its ends with the inner wall of the dust excluding cap 1.

Obviously, my invention is susceptible of embodiment in forms other than that which is illustrated in the accompanying drawings and I therefore consider as my own all such modifications and adaptations thereof as fairly fall within the scope of the appended claims.

I claim:—

1. A device of the character described comprising a cap adapted to slide over the outer end of a tire valve stem to position to abut the usual rim nut at the inner end of the projecting portion of the tire valve stem, a nut slidable within the cap and held against rotation in the cap, said nut being engageable at its inner end with the outer end portion of the tire valve stem, a sealing member within the nut for engaging with the outer end of the stem to seal the latter, said nut being formed with diametrically opposite openings adjacent to its outer end and outwardly from said seal, and an inwardly bowed spring locking member having the intermediate portion thereof pressing against said sealing member and having the end portions thereof disposed in said openings, said locking member being adapted to frictionally engage at its ends with the inner wall of the cap when the nut is screwed onto the tire valve stem.

2. A device of the character described comprising a cap adapted to slide over the outer end of a tire valve stem to position to abut the usual rim nut at the inner end of the projecting portion of the tire valve stem, a nut slidable within the cap and held against rotation in the cap, said nut being engageable at its inner end with the outer end portion of the tire valve stem, a sealing member within the nut for engaging with the outer end of the stem to seal the latter, said nut being formed with diametrically opposite openings adjacent to its outer end and outwardly from said seal, and an inwardly bowed spring locking member having the intermediate portion thereof pressing against said sealing member and having the end portions thereof disposed in said openings, said locking member being adapted to frictionally engage at its ends with the inner wall of the cap when the nut is screwed onto the tire valve stem, the inner walls of said openings being inclined inwardly from their outer ends to extend obliquely to the longitudinal axes of the nut and the outer walls of the openings extending at right angles to the longitudinal axis of the nut.

GEORGE W. OAKES.